(12) United States Patent
Morioka et al.

(10) Patent No.: US 10,247,805 B2
(45) Date of Patent: Apr. 2, 2019

(54) OBSERVATION SUPPORTING APPARATUS AND OBSERVATION SUPPORTING METHOD

(71) Applicant: MITSUBISHI HEAVY INDUSTRIES, LTD., Tokyo (JP)

(72) Inventors: Tomoya Morioka, Tokyo (JP);
Takahiro Yamada, Tokyo (JP);
Tomohiro Hoshino, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 631 days.

(21) Appl. No.: 14/580,611

(22) Filed: Dec. 23, 2014

(65) Prior Publication Data
US 2015/0323305 A1 Nov. 12, 2015

(30) Foreign Application Priority Data
May 9, 2014 (JP) .................................. 2014-098109

(51) Int. Cl.
*G01S 3/78* (2006.01)
*G01B 11/00* (2006.01)

(52) U.S. Cl.
CPC .............. *G01S 3/78* (2013.01); *G01B 11/002* (2013.01)

(58) Field of Classification Search
CPC ................................................... G01B 11/002
See application file for complete search history.

(56) References Cited

U.S. PATENT DOCUMENTS

| 5,473,746 | A | * | 12/1995 | Pritt | ......................... | B64G 1/22 |
| | | | | | | 318/582 |
| 7,319,556 | B1 | * | 1/2008 | Ackermann | ....... | G02B 17/0652 |
| | | | | | | 359/366 |
| 2013/0264463 | A1 | * | 10/2013 | Martin | ..................... | B64G 3/00 |
| | | | | | | 250/206.2 |

FOREIGN PATENT DOCUMENTS

JP 2011-157030 8/2011

OTHER PUBLICATIONS

Schmunk, Matthew, "Initial Determination of Low Earth Orbits Using Commercial Telescopes", Master's Thesis Mar. 2008, Department of Aeronautics and Astronautics Graduate School of Engineering and Management Air Force Institute of Technology Air University Air Education and Training Command.*
Yeoh et al. "Accurate Real-Time Object Tracking with Linear Prediction Method", 2003 pp. III-941-III-944.*
Der, Gim, "New Angles-only Algorithms for Initial Orbit Determination", 2012 Amos Conference, pp. 1-16.*
SkyX Pro, "User Guide", 2012 Revision 1.4.8.*
Samadzadegan et al., "The Design and Implementation of an Optical Astronomical Satellite Tracking System", Oct. 2013, Intl. Arch. of Photo. Remote Sensing & Spatial Sci., pp. 25-30.*

(Continued)

*Primary Examiner* — Regis J Betsch
(74) *Attorney, Agent, or Firm* — Wenderoth, Lind & Ponack, L.L.P.

(57) ABSTRACT

An observation supporting apparatus includes a position specifying section which specifies a coordinate point of a moving object detected in a viewing field through once observation. An orbit estimating section calculates an estimate orbit of the moving object in the viewing field based on the specified coordinate points. Data necessary to estimate the position of the moving object out of the viewing field is (Continued)

acquired using the estimate orbit by the orbit estimating section.

15 Claims, 11 Drawing Sheets

(56)  References Cited

OTHER PUBLICATIONS

Martin P. Lévesque, "Detection of Artificial Satellites in Images Acquired in Track Rate Mode", Presented to: Advanced Maui Optical and Space Surveillance Technologies Conference, Maui, Sep. 13-16, 2011 (Year: 2011).*

Toshifumi Yanagisawa et al., "Investigation of Ground-Based Optical Observation System for LEO Objects", Japan Aerospace Exploration Agency, Chofu, Japan, Oct. 9, 2013, pp. 1-5.

Notification of Reasons for Refusal dated Oct. 11, 2017 in corresponding Japanese Patent Application No. 2014-098109, with English-language translation.

\* cited by examiner

OBSERVATION SUPPORTING APPARATUS AND OBSERVATION SUPPORTING METHOD

TECHNICAL FIELD

The present invention is related to an observation supporting apparatus and an observation supporting method, and more particularly, to an observation supporting apparatus and an observation supporting method which estimate a position of a moving object which moves on an orbit.

BACKGROUND ART

When estimating an orbit of an object which moves on an orbit (e.g. an artificial satellite and space debris) by using an optical observation equipment (e.g. an optical telescope), at least three coordinate points need to be specified. However, because the viewing angle is narrow in the optical observation equipment, it is difficult to detect three coordinate points of the object moving at high speed through once observation. Also, even if it is supposed that the three coordinate points of the moving object can be detected through the once observation by an observation equipment having the narrow viewing angle, the orbit estimated based on the coordinate points contains a large error.

For example, as shown in FIG. 1, in case of an optical telescope 101 having a relatively wide viewing field 110, three coordinate points 120-1, 120-2, and 120-3 of the moving object can be detected in the viewing field 110. In this case, an orbit 130-1 can be estimated by using the coordinate points 120-1, 120-2, and 120-3. However, when considering an observation error, the estimate orbit has an error in a range from an orbit 130-2 to an orbit 130-3. Because the coordinate points 120-1, 120-2, and 120-3 are detected in a narrow viewing field 110, the observation elongation α10 is small. Therefore, the error range exemplified as a range from the orbit 130-2 to the orbit 130-3 becomes large and the orbit estimation precision becomes low.

In this way, because the viewing angle of the optical telescope is narrow, it is difficult to estimate the orbit of the object moving at high speed. However, because the angle resolution of the optical telescope is high, it is desirable to estimate the orbit by using the coordinate points observed by the optical telescope, for orbit estimation in a high precision. For example, Patent Literature 1 (JP 2011-157030A) discloses a method of acquiring orbit data of a flying vehicle in a high precision by using a radar unit and an optical telescope.

Patent literature 1 determines an observation time and viewing angle of the optical telescope by using orbit 6 matters which are calculated based on a detection result by the radar. Thus, the monitoring by the radar with a low angle resolution can be made up, because it becomes possible to discover and track the flying vehicle moving at a high angular speed by using the optical telescope with the high angle resolution.

In Patent Literature 1, the radar monitoring precision can be made up but it is necessary to calculate the orbit 6 matters to determine an observation direction of the optical telescope. In other words, when carrying out a tracking observation by the optical telescope in order to improve the orbit estimation precision, the orbit 6 matters need to be calculated based on the radar detection result.

Also, in Patent Literature 1, whether the orbit of the monitoring object is known is determined based on the comparison result between the known orbits and an orbit which is estimated based on the detection result by the radar. However, because whether the monitoring object is known or unknown is determined after a specifiable orbit (whole orbit) is estimated based on the orbit 6 matters, the efficiency of the discovery of the unknown object is low.

CITATION LIST

[Patent Literature 1] JP 2011-157030A

SUMMARY OF THE INVENTION

From the above, an object of the present invention is to provide an observation supporting apparatus and an observation supporting method, in which data necessary to estimate the whole orbit can be acquired even in case of an observation equipment having a narrower viewing field than a predetermined viewing field.

Also, another object of the present invention is to provide an observation supporting apparatus and an observation supporting method, which have a high discovery efficiency of an unknown object.

In an aspect, an observation supporting apparatus of the present invention includes a position specifying section configured to specify coordinate points of a moving object detected in a viewing field observable once; and an orbit estimating section configured to calculate an estimate orbit of the moving object in the viewing field based on the coordinate points. The orbit estimating section acquires data necessary to estimate a position of the moving object out of the viewing field by using the estimate orbit.

The observation supporting apparatus of the present invention is preferably further provided with an orbit determining section configured to determine whether a whole orbit of the moving object is known or unknown, based on a result of comparison between a known orbit in a predetermined period which contains a time at which the moving object is detected and the estimate orbit.

Here, it is desirable that the estimate orbit is a primary curve subjected to approximate linearization. The orbit determining section determines that the whole orbit of the moving object is known, when an inclination of the estimate orbit and an inclination of the known orbit coincide with each other within a predetermined error.

It is desirable that the orbit estimating section determines a next observation range on an extension of the estimate orbit. At this time, it is desirable that the orbit estimating section calculates the whole orbit of the moving object by using the coordinate points of the moving object detected in the observation direction.

In another aspect, an observation supporting method of the present invention is executed by a computer, and includes: calculating an estimate orbit of a moving object in a viewing field based on coordinate points of the moving object detected in the viewing field observable once; and acquiring data necessary to estimate a position of the moving object out of the viewing field by using the estimate orbit.

It is desirable that the acquiring data includes: determining whether a whole orbit of the moving object is known or unknown based on a result of comparison between a known orbit and the estimate orbit in a predetermined period which contains a time at which the moving object is detected.

It is desirable that the estimate orbit is a primary curve subjected to approximated linearization. The determining includes: determining that the whole orbit of the moving object is known, when an inclination of the estimate orbit and an inclination of a known orbit coincide with each other within a predetermined error.

It is desirable that the observation supporting method of the present invention further includes: determining a next observation range on an extension of the estimate orbit. Also, it is desirable that the observation supporting method of the present invention further includes: calculating the whole orbit of the moving object by using the coordinate points of the moving object which are detected in the observation direction.

It is desirable that the observation supporting method of the present invention is realized by an observation support program, which can be recorded in a recording medium and is executed by a computer execute.

According to the present invention, the data necessary to estimate the whole orbit can be acquired by the observation equipment having a narrower viewing field than a predetermined viewing field.

Also, the discovery efficiency of the unknown object can be improved.

DESCRIPTION OF THE EMBODIMENTS

Figure 1:
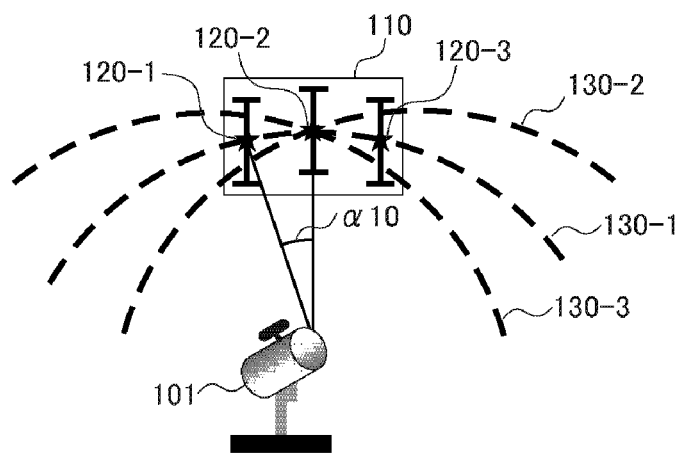
FIG. 1 is a conceptual diagram showing an example of a method of estimating an orbit in a conventional technique.

Hereinafter, the embodiments of the present invention will be described with reference to the attached drawings. In the drawings, identical reference numerals show identical components. When the components should be distinguished, additional numbers are added to the reference numerals, and when the components need not to be distinguished, the additional numbers are not added. The following embodiments will be described by using as an example, an observation system using an optical telescope as observation equipment having a narrow viewing angle.

(Overview)

The observation supporting apparatus of the present invention calculates an estimate orbit in the viewing field from coordinate points and bright line shape of the observed moving object. In the present invention, the orientation (the observation direction) of the observation equipment (e.g. an optical telescope) is set on the extension of the estimate orbit (a first embodiment). Thus, the tracking of the high-speed moving object becomes possible even if the observation equipment of a narrow viewing field is used. Also, the observation supporting apparatus 2 of the present invention estimates the whole orbit of the moving object (a second embodiment) by using the coordinate points of the moving object observed in the observation direction which is set based on the estimate orbit. Thus, the whole orbit of the high-speed moving object can be estimated by using the observation equipment having the narrow viewing field but a high angle resolution. Moreover, the observation supporting apparatus 2 of the present invention can determine whether (the orbit of) the moving object is known or unknown based on the result of the comparison of the known orbits stored in the database and the estimate orbit (a third embodiment). At this time, when determined to be unknown, the observation supporting apparatus 2 of the present invention estimates the whole orbit of the moving object, like the second embodiment (a fourth embodiment). According to the present invention, the unknown moving object can be efficiently discovered because whether the orbit of the moving object is known or unknown can be determined based on the estimate orbit in the viewing field without estimating the whole orbit. Also, because the coordinate points of the moving object which are determined to be unknown can be detected based on the observation elongation larger than the view angle of the observation equipment through the tracking observation, the whole orbit of the moving object can be estimated in a high precision.

An observation system and an observation supporting apparatus of the present invention are effective for the observation, the "known or unknown" object determination and the orbit estimation of a moving object (artificial satellite or space debris) moving at a high speed on a low orbit of 200 km to 2000 km above the earth. Especially, it is desirable to carry out the "known or unknown" determination and the determination of the pointing direction (the observation direction) of an observation equipment by using the estimate orbit which is subjected to linear approximation of the orbit in the viewing field when the moving object is observed at a position where the elevation angle to the optical telescope 1 is smaller than a predetermined value.

(Configuration of the Observation System and the Observation Supporting Apparatus)

Figure 2:
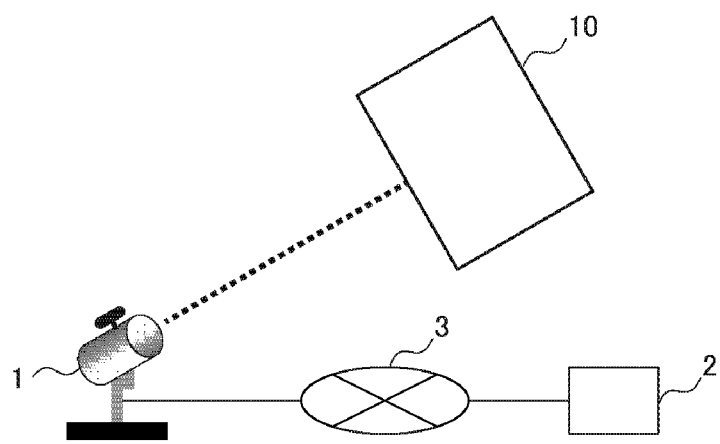
FIG. 2 is a diagram showing a configuration example of an observation system of the present invention.
Figure 3:
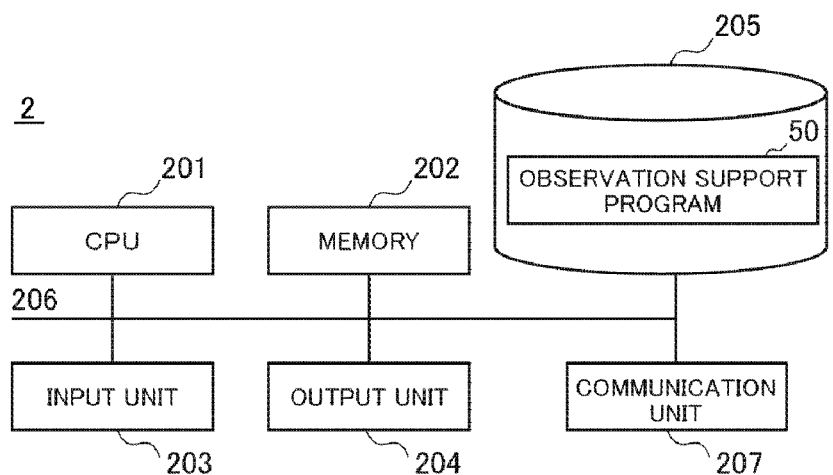
FIG. 3 is a diagram showing a configuration example of an observation supporting apparatus of the present invention.

Referring to FIG. 2 and FIG. 3, the details of the configuration of the observation system and the observation supporting apparatus 2 of the present invention will be described. FIG. 2 is a diagram showing a configuration example of the observation system of the present invention. Referring to FIG. 2, the observation system of the present invention includes the optical telescope 1 and the observation supporting apparatus 2 connected through a network 3.

The optical telescope 1 includes a CCD sensor, and digitalizes an image imaged through an optical system by the CCD sensor, to output to the observation supporting apparatus 2 through the network 3. It is desirable that the optical telescope 1 is installed on an altazimuth mount or an equatorial mount which can change the observation direction in response to a control signal. In this case, it is desirable that the observation direction of the optical telescope 1 can be changed in response to the control signal from the observation supporting apparatus 2. Also, it is desirable that the optical telescope 1 is a telescope of large aperture which can achieve a good angle resolution. In this case, the optical telescope 1 of a large aperture is operated for a fixed observation direction for detection of an unknown object. Also, the optical telescope 1 having a relatively light-weight, a small aperture and a wide viewing field is operated for tracking of the moving object.

The network 3 is a network such as the Internet, LAN (Local Area Network) and WAN (Wide Area Network) and a communications line such as a leased line.

FIG. 3 is a block diagram showing a configuration example of the observation supporting apparatus 2 of the present invention. Referring to FIG. 3, the observation supporting apparatus 2 includes a CPU 201 (to be also referred to as an processing unit), a memory 202, an input unit 203, an output unit 204, a storage unit 205, a communication unit 207, which are all connected with each other through a bus 206. The input unit 203 is exemplified by a keyboard and a mouse and is operated by a user to output various data to the CPU 201 and the storage unit 205. The output unit 204 is exemplified by a monitor and a printer and visibly outputs an observation result and orbit data supplied from the CPU 201 to the user. The storage unit 205 is an external storage unit such as a hard disk and a memory. The communication unit 207 is an interface connected with the optical telescope 1 through the network 3 and controls communication with the optical telescope 1.

An observation support program 50 is stored in the storage unit 205. The CPU 201 realizes a position specifying section 501, an orbit estimating section 502, and a control section 503, an orbit determining section 504 to be described later by executing the observation support program 50 in the storage unit 205. In this case, various types of data and the program are stored in the memory 202 from the storage unit 205 temporarily and the CPU 201 performs various types of processing by using the data in the memory 202.

First Embodiment

Figure 4:
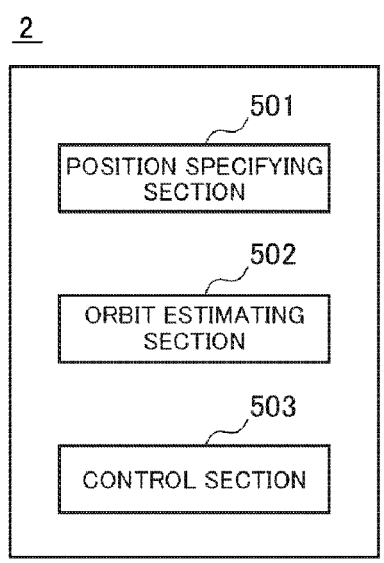
FIG. 4 is a diagram showing a configuration example of the observation supporting apparatus in a first embodiment.

Referring to FIG. 4 to FIG. 7, the observation system and the observation supporting apparatus 2 according to a first embodiment of the present invention will be described. The observation supporting apparatus 2 of the first embodiment calculates an estimate orbit 100 in a viewing field 10 from coordinate points and the shape of a bright line of the observed moving object and sets the observation direction of the optical telescope 1 onto the extension of the estimate orbit 100. FIG. 4 is a functional block diagram showing a configuration example of the observation supporting apparatus 2 of the first embodiment. Referring to FIG. 4, the CPU 201 in the first embodiment realizes each function of the position specifying section 501, the orbit estimating section 502 and the control section 503 by executing the observation support program 50.

The position specifying section 501 analyzes the image imaged by the optical telescope 1 and specifies a moving object. For example, when the optical telescope 1 images through the exposure in a period T1 of a time t1 to a time t2 in a predetermined fixed observation direction, the moving object is imaged as a bright line 21 shown in FIG. 5. In this case, the position specifying section 501 specifies the bright line having a length longer than a predetermined value in the image as the bright line 21 of the moving object. Or, when imaged at the time t1 and the time t2, a period between which is the period T1, by the optical telescope 1 in the predetermined fixed observation direction, the moving object is detected as light points spaced by a fixed distance (not shown). In this case, the position specifying section 501 specifies the light points separated by a distance longer than a predetermined value in the image as the light points of the moving object. The position specifying section 501 extracts and stores coordinate points 20 on the bright line or the light points of the moving object in the storage unit 205. In this case, it is desirable that the coordinate point 20 is represented in right ascension and declination on the equatorial coordinate system.

The orbit estimating section 502 calculates the estimate orbit 100 in the viewing field 10 of the optical telescope 1 and determines the pointing direction (the observation direction) of the optical telescope 1 by using this. In detail, the orbit estimating section 502 calculates an approximate curve of the bright line from the shape of the bright line 21 specified as the bright line of the moving object and the coordinates on the bright line 21 and outputs the approximate curve as the estimate orbit 100. For example, referring to FIG. 6, the orbit estimating section 502 calculates a primary straight line obtained by extending the bright line 21 in a longitudinal direction as the estimate orbit 100. Or, the orbit estimating section 502 calculates a straight line which links two points on the bright line 21 specified as the bright line of the moving object, as the estimate orbit 100. Moreover, the orbit estimating section 502 may calculate as the estimate orbit 100, a secondary or higher order approximate curve from a plurality of points on the bright line 21 specified as the bright line of the moving object. Also, although not shown, when two or more light points are specified as points on the bright line of the moving object, the approximate curve obtained by using the coordinates of the two or more light points (the primary straight line or secondary or high order approximate curve) is calculated as the estimate orbit 100. Note that the estimate orbit 100 obtained by the linear approximation is effective for the moving object which moves on an orbit which is lower than a predetermined height (e.g. equal to or less than 2000 km), and the estimate orbit 100 obtained by the secondary or higher order curve approximation is effective for the moving object which moves on the orbit which is higher than the predetermined height.

Figure 6:
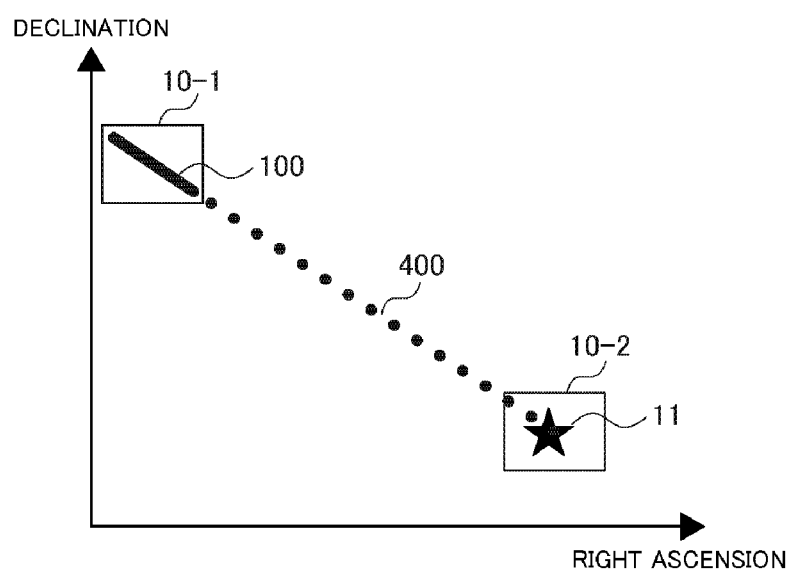
FIG. 6 is a diagram showing a setting example of the pointing direction of an optical telescope in the observation supporting apparatus of the present invention.

The orbit estimating section 502 determines the pointing direction 11 of the optical telescope 1 on the extension of the estimate orbit 100 outside the viewing field 10. In detail, as shown in FIG. 6, the orbit estimating section 502 extends the estimate orbit 100 in the viewing field 10-1 observed for a predetermined period to a point out of the viewing field 10-1, and determines a tracking line 400. The orbit estimating section 502 sets a coordinate point separated by a predetermined observation elongation to the predetermined coordinate point on the tracking line 400 in the viewing field 10-1, as the pointing direction 11 of the optical telescope 1. Here, it is desirable that the observation elongation which determines the pointing direction 11 is set according to an angular speed of the moving object which is determined based on the observation period T1 and the length of the bright line 21 in the viewing field 10-1. Also, it is desirable that the coordinates of an original point for determination of the pointing direction 11 in the viewing field 10-1 are on the bright line 21 at a predetermined time. Also, it is desirable that the pointing direction 11 is stored in the storage unit 205.

Figure 7:
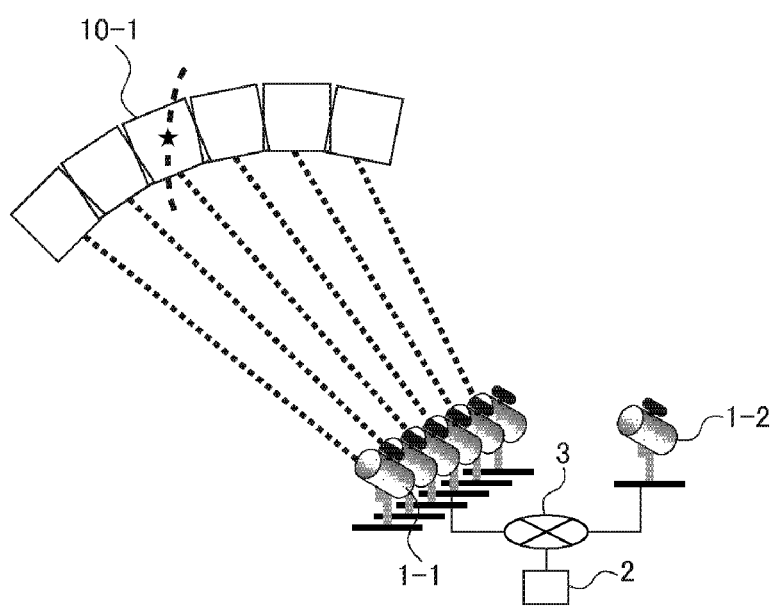
FIG. 7 is a diagram showing an example of an observation method of a first embodiment.

The control section 503 controls the observation direction (pointing direction) of the optical telescope 1 based on the pointing direction 11 determined by the orbit estimating section 502. At this time, the control section 503 may control the optical telescope 1 which is the same as the optical telescope 1 which has detected the moving object and may control an optical telescope 1 which is different from the optical telescope 1 which has detected the moving object. For example, as shown in FIG. 7, when the observation system includes a plurality of optical telescopes 1-1 in which the observation direction is fixed, and an optical telescope 1-2 for the tracking operation, the control section 503 may control the optical telescope 1-2 to the pointing direction 11 calculated based on the coordinates of the moving object which has been detected by the optical telescope 1-1. It is easy to track the object moving at high speed by preparing the optical telescopes 1-1 which detects the moving object and the optical telescope 1-2 for the tracking operation. Also, as shown in FIG. 7, it is easy to detect an unknown moving object whose orbit is unknown by preparing the plurality of optical telescopes 1-1 to observe fixed observation ranges and always monitoring the fixed observation ranges. Note that the control section 503 may output the control signal for changing the observation direction of the optical telescope 1 but may output data indicating the pointing direction 11 to the optical telescope 1. Also, the control section 503 may be omitted.

By turning the observation direction of the optical telescope 1 to the pointing direction 11 before a reaching time of the moving object to the pointing direction 11 which is estimated based on the angular speed of the moving object, it is possible to catch the moving object in the following viewing field 10-2. Also, when (the bright line 21 of) the moving object is observed in the viewing field 10-2 after the tracking operation, the observation supporting apparatus 2 in the present embodiment can calculate the estimate orbit 100 in the same way as described above, and specify the following pointing direction 11 by using the calculated estimate orbit 100. Also, the observation supporting apparatus 2 can control the optical telescope 1 to the pointing direction 11. In this way, according to the observation supporting apparatus 2 of the present invention, it is possible to acquire data necessary to estimate the whole orbit (in this example, the pointing direction 11 necessary for the tracking operation and the coordinate points of the moving object) even by an observation equipment in which the viewing field 10 is smaller than a predetermined size (e.g. the optical telescope 1). Also, according to the present invention, it is possible to carry out the tracking observation of the moving object in which the whole orbit is not known, only by the optical telescopes 1.

In the present embodiment, because the position of the moving object out of the viewing field 10 can be predicted by using the trajectory (the bright line 21) of the moving object observed in the viewing field 10 of the optical telescope 1, it is possible to predict and acquire a coordinate point of the moving object in the observation elongation which is larger than the viewing angle of the optical telescope 1. Also, in the present embodiment, because the moving object can be tracked based on the estimate orbit 100 in the viewing field 10 without calculating the orbit 6 matters of the moving object, an error risk when calculating the whole orbit specified by the orbit 6 matters can be excluded, in addition to reduction of the observation cost required for the tracking.

Second Embodiment

Figure 8:
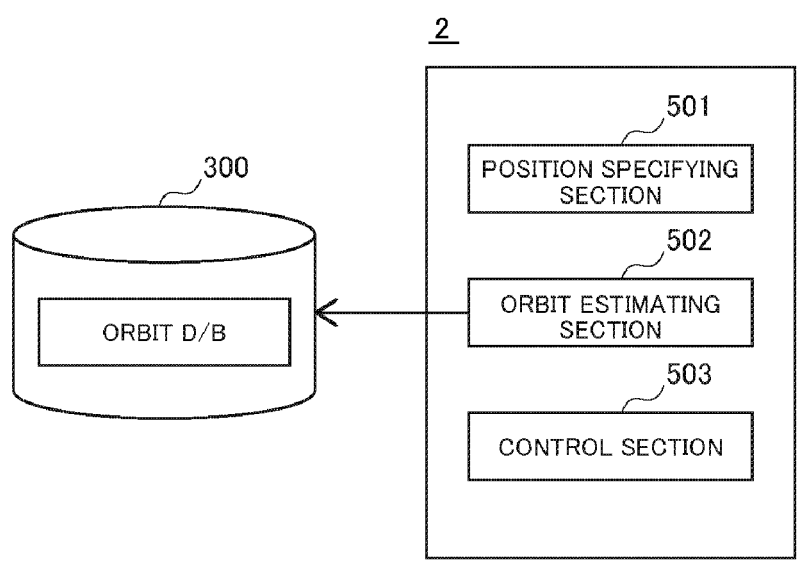
FIG. 8 is a diagram showing a configuration example of an observation supporting apparatus in a second embodiment.
Figure 9:
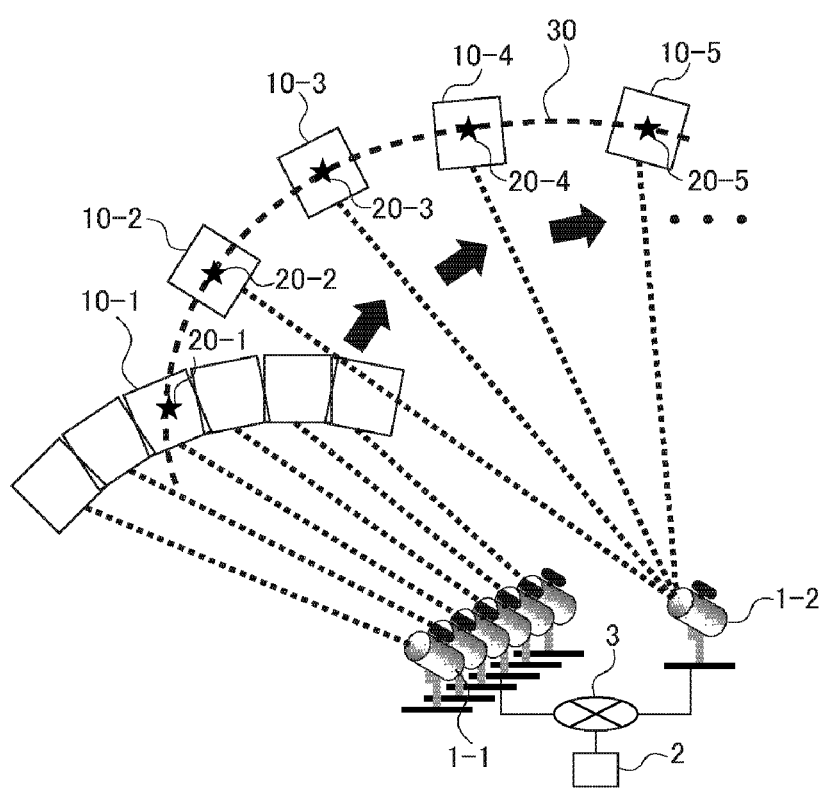
FIG. 9 is a diagram showing an example of an observation method (a tracking method) of the second embodiment.
Figure 10:
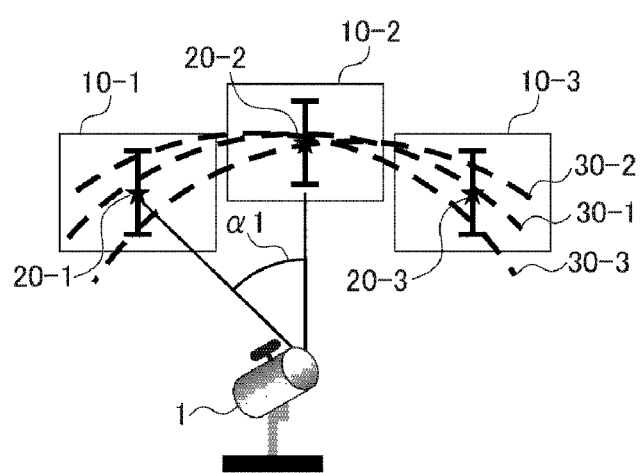
FIG. 10 is a conceptual diagram showing an example of a method of estimating an orbit according to the present invention.

Referring to FIG. 8 to FIG. 10, the observation system and the observation supporting apparatus 2 according to the second embodiment of the present invention will be described. The observation supporting apparatus 2 of the second embodiment estimates the whole orbit of the moving object (e.g. the orbit around the earth) by using the coordinate points of the moving object detected in the large observation elongation while tracking the moving object in the similar way to the first embodiment. FIG. 8 is a functional block diagram showing the configuration example of the observation supporting apparatus 2 in the second embodiment. Referring to FIG. 8, the CPU 201 in the second embodiment executes the observation support program 50 to realize each function of the position specifying section 501, the orbit estimating section 502 and the control section 503.

The position specifying section 501 analyzes the image which is imaged by the optical telescope 1 and specifies the moving object, like the first embodiment. The position specifying section 501 stores the coordinate points or light points 20 (20-1, 20-2, . . . ) on a bright line 21 specified as the trajectory of the moving object in the storage unit 205 as observation result data. Note that it is desirable that the coordinate point 20 to be stored as the positions of the moving object are a coordinate point on the bright line 21 in a predetermined time.

The orbit estimating section 502 calculates the estimate orbit 100 in the viewing field 10 of the optical telescope 1 and determines the pointing direction 11 of the optical telescope 1 by using the estimate orbit 100, like the first embodiment. Also, the orbit estimating section 502 of the present embodiment calculates the whole orbit 30 of the moving object based on the observation result data which have been stored as the coordinate points 20 of the moving object. In detailed, the observation supporting apparatus 2 of the present embodiment stores at least three coordinate points of the moving object by repeating the calculation of the pointing direction 11 of the optical telescope 1 and the detection of the coordinate point 20 of the moving object in the pointing direction 11, in the same way as the first embodiment. The orbit estimating section 502 calculates the whole orbit 30 which can be specified based on the orbit 6 matters (semi-major axis, eccentricity, orbit inclination, ascending right-ascension, argument of perigee, anomaly) according to a predetermined algorithm (e.g. Gauss method, WR method or Gooding method) by using the coordinate data (right-ascension, declination) of at least three points of the moving object. It is desirable that the calculated whole orbit 30 is stored in the orbit database 300. The orbit database 300 may be provided for the observation supporting apparatus 2 and may be provided for an external system.

The control section 503 controls the observation direction (the pointing direction) of the optical telescope 1 based on the pointing direction 11 obtained by the orbit estimating section 502, like the first embodiment.

Referring to FIG. 9 and FIG. 10, a specific example of the orbit estimating method of the moving object by the observation system of the present embodiment will be described. Referring to FIG. 9, when a coordinate point 20-1 of the moving object is detected in a viewing field 10-1 by the optical telescope 1-1, the observation supporting apparatus 2 calculates the estimate orbit 100 in the viewing field 10-1 and sets a next pointing direction 11 by using the estimate orbit 100. The optical telescope 1-2 observes the set pointing direction 11 at a predetermined time and detects a coordinate point 20-2 of the moving object in a viewing field 10-2. At this time, the observation supporting apparatus 2 calculates the estimate orbit 100 in the viewing field 10-2 and sets a next pointing direction 11 by using the calculated estimate orbit 100. The optical telescope 1-2 observes the set pointing direction 11 at a predetermined time and detects a coordinate point 20-3 of the moving object in a viewing field 10-3. At this time, the observation supporting apparatus 2 calculates the estimate orbit 100 in the viewing field 10-3 and sets a next pointing direction 11 by using the calculated estimate orbit 100. Hereinafter, in the same way, the optical telescope 1-2 detects a coordinate point 20-4 in a viewing field 10-4 and a coordinate point 20-5 in a viewing field 10-5, . . . .

Referring to FIG. 10, the observation supporting apparatus 2 calculates the whole orbit 30-1 based on at least three of the detected coordinate points 20 (e.g. coordinate points 20-1, 20-2, and 20-3). Here, because each of the coordinate points 20-1, 20-2, and 20-3 has an observation error, the calculated orbit includes an error in a range of the whole orbit 30-2 to the whole orbit 30-3. However, in the present invention, the observation elongation α1 among the observed coordinate points 20 of the moving object is larger than the viewing angle of the viewing field 10. That is, the observation elongation α1 is larger than the observation elongation α10 in the conventional example shown in FIG. 1, and an error range of the whole orbit 30 becomes small and the orbit estimation in a high precision becomes possible.

According to the observation supporting apparatus 2 of the second embodiment, it is possible to acquire data necessary to estimate the whole orbit (in this example, the pointing direction 11 and the coordinate point of the moving object, which are required for the tracking operation) even if an observation equipment (e.g. the optical telescope 1) is used which has the viewing field 10 smaller than a predetermined size, like the first embodiment. Also, the tracking observation of the moving object whose whole orbit is not known becomes possible by using only the optical telescopes 1.

Also, in the present embodiment, because a position of the moving object out of the viewing field 10 can be estimated by using the trajectory (the bright line 21) of the moving object which has been observed in the viewing field 10 of the optical telescope 1, it is possible to acquire the coordinate points of the moving object in the observation elongation larger than the viewing angle of the optical telescope 1. Moreover, in the present embodiment, because the moving object can be tracked based on the estimate orbit 100 in the viewing field 10 without calculating the orbit 6 matters of the moving object, the observation cost for the tracking operation can be reduced and an error risk when the orbit 6 matters are calculated can be excluded.

Moreover, in the present embodiment, because the observation supporting apparatus 2 detects the coordinate point (right-ascension, declination) of the moving object in the observation elongation larger than the viewing angle and uses the detected coordinate points for the orbit estimation, the whole orbit 30 specified based on the orbit 6 matters (e.g. the orbit around the earth) can be precisely estimated.

Third Embodiment

Figure 11:
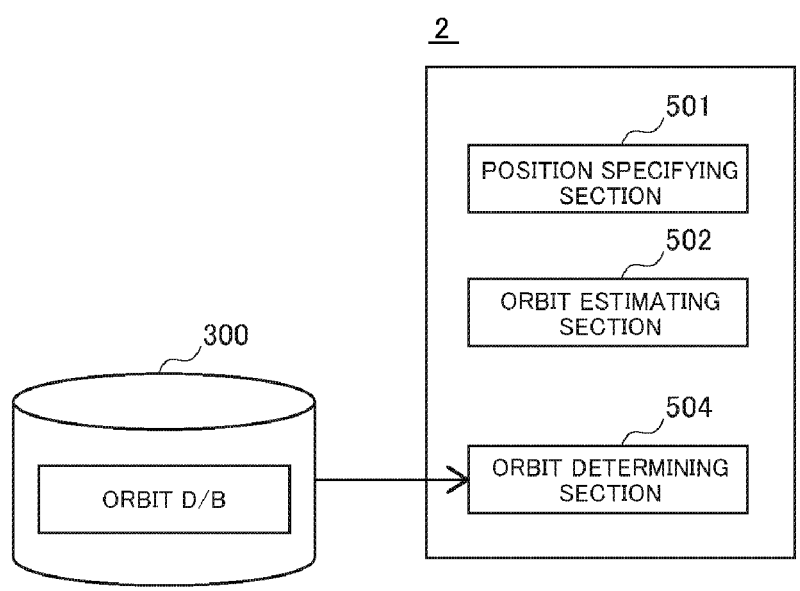
FIG. 11 is a diagram showing a configuration example of the observation supporting apparatus in a third embodiment.
Figure 12:
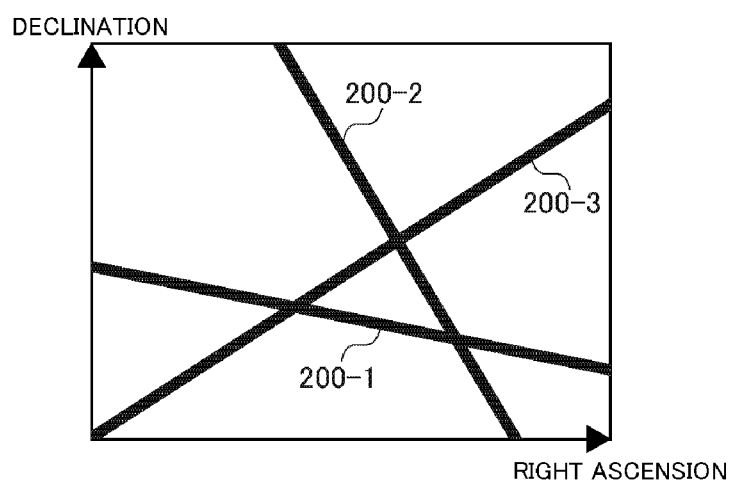
FIG. 12 is a diagram showing an example of a known orbit which is recorded to a known orbit database according to the present invention.
Figure 13:
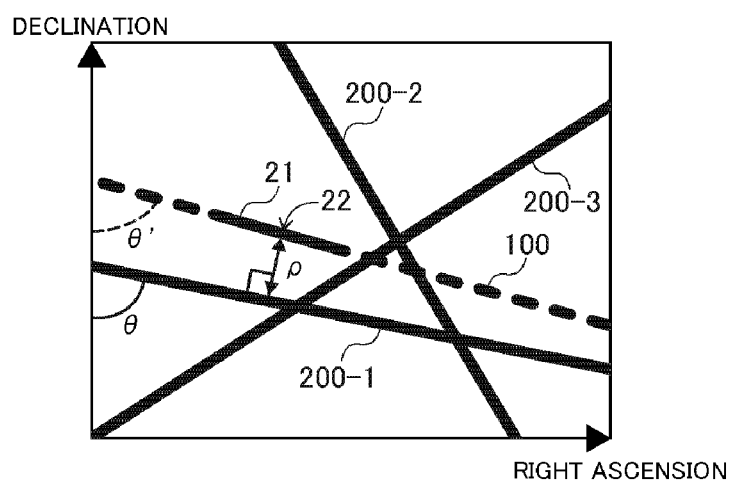
FIG. 13 is a diagram showing an example of a known orbit determining process in the observation supporting apparatus according to the present invention.

Referring to FIG. 11 to FIG. 13, the observation system and the observation supporting apparatus 2 according to a third embodiment of the present invention will be described. The observation supporting apparatus 2 of the third embodiment determines whether (the orbit of) the moving object is known or unknown based on the comparison result of the estimate orbit in the viewing field 10 and known orbits stored in the database. FIG. 11 is a functional block diagram showing the configuration example of the observation supporting apparatus 2 of the third embodiment. Referring to FIG. 11, the CPU 201 in the third embodiment executes the observation support program 50 to realize each of the functions of the position specifying section 501, the orbit estimating section 502 and the orbit determining section 504.

The position specifying section 501 analyzes the image data imaged by the optical telescope 1 and specifies the moving object, like the first embodiment. The orbit estimating section 502 calculates the estimate orbit 100 in the viewing field 10 of the optical telescope 1, like the first embodiment.

The orbit determining section 504 compares the whole orbit of known moving object (hereinafter, to be referred to as a known orbit) which is stored in the orbit database 300 and the estimate orbit 100 calculated by the orbit estimating section 502. The orbit determining section 504 determines (the orbit of) the observed moving object to be known when both coincide with each other in a predetermined range, and determines (the orbit of) the object to be unknown when both do not coincide each other.

In detail, data of the orbit of the moving object which can be specified based on the orbit 6 matters are stored in the orbit database 300. The orbit determining section 504 extracts known orbits 200 in the viewing field 10 at an observation time (or in an observation period) and the pointing direction (the observation direction) from the orbit database 300 based on the observation time (or the observation period) when the moving object is imaged. At this time, it is desirable that the time range when extracting the known orbits 200 is set as a period which contains the observation time. For example, it is desirable that the orbit in the period which has an error range "ΔT" added to the front portion and the rear portion of the observation time is extracted as the known orbit 200. An error range "ΔT" shows a time error estimated from a position estimation error to the direction of the progress of the moving object. For example, the error range "ΔT" is determined by converting an error of the direction of the progress of the moving object which is determined from the orbit estimation precision of the publication TLE (Two Line Element) into a time error. Specifically, the error range "ΔT" is determined from "an error of the direction of the progress after a predetermined period (e.g. X days) from the orbit estimation" which has been published in the TLE orbit estimation precision in the height of the known orbit. FIG. 12 is a diagram showing an example of the known orbits 200 in the same pointing direction (the observation direction) and viewing field 10 as the observation result shown in FIG. 5. In this case, the known orbits 200-1, 200-2, and 200-3 of the moving object which crosses the viewing field 10 are shown in the period in which the time error "ΔT" is added to the observation time of the observation result shown in FIG. 5. Note that it is sufficient that the extraction range of the known orbits 200 extracted to carry out the "known or unknown" determination is a period which can be compared with the estimate orbit 100 and may be set in an optional period.

The orbit determining section 504 compares the known orbits 200 and the estimate orbit 100 calculated based on the detected bright line 21. At this time, the orbit determining section 504 determines whether the estimate orbit 100 and the known orbits 200 coincide with each other in a predetermined range (to be referred to as "determination condition"). For example, in case where the estimate orbit 100 shows a primary straight line, when a difference "|θ−θ'|" between an inclination "θ'" of the estimate orbit 100 and an inclination "θ" of the known orbit 200 (or, a approximated primary straight line of the known orbit 200) is smaller than a determination condition "Δθ", and when a distance "ρ" from a point on the known orbit 200 which is the nearest to a predetermined coordinate point 22 on the bright line 21 is smaller than a determination condition "Δρ", it is determined that the estimate orbit 100 and the known orbit 200 coincide with each other under the determination condition. FIG. 13 is a diagram showing an example of the determination processing in which the observation result shown in FIG. 5 and the known orbit shown in FIG. 12 are displayed together. Referring to FIG. 13, when the difference from the inclination "θ'" of the estimate orbit 100 is smaller than "Δθ" and the shortest distance "ρ" from the predetermined coordinate point 22 on the bright line 21 (the central point of the bright line 21 in this case) is smaller than Δρ, the known orbit 200-1 is determined to coincide with the estimate orbit 100 under the determination condition. Here, when there is the known orbit 200 which meets the determination condition, that is, when there is the known orbit 200 which coincide with the estimate orbit 100 under the determination condition, the orbit determining section 504 determines (the orbit of) the observed moving object to be known. On the other hand, when there is not a known orbit 200 which meets the determination condition, that is, when all of the extracted known orbits 200 do not coincide with the estimate orbit 100 under the determination condition, the orbit determining section 504 determines (the orbit of) the observed moving object to be unknown. For example, it is desirable that the observation error of the optical telescope 1 is set as the determination condition "Δθ". Also, it is desirable that the determination condition "Δρ" is a position error of the publication TLE. For example, the position error prescribed in the TLE orbit estimation precision in the height of the known orbit is set as Δρ. Note that it is desirable that the determination condition "Δθ" is variable based on the shape (length) of the observed bright line 21, the observation elevation angle, and the exposure time. Also, it is desirable that the determination condition "Δρ" is variable to each known orbit based on the estimated date and time of the known orbit like the error range "ΔT". Thus, it is possible to estimate the orbit in a higher efficiency.

In the present invention, not a difference between the coordinate point of the moving object at a predetermined time and the coordinate point on the known orbit but a difference in the inclination between the estimate orbit 100 and the known orbit in a predetermined period is used as the determination condition (tolerance) of the "known or unknown" determination. An error of the known orbit which has been registered on the orbit database 300 contains an error to the direction of the progress. Therefore, if the "known or unknown" determination is carried out by using an "inclination" obtained by differentiating the position with the time, it is possible to carry out the "known or unknown" determination, excluding an error to the direction of the progress. Thus, it is possible to carry out the "known or unknown" determination of the moving object without undergoing influence of the error of the known orbit which has been registered on the orbit database 300.

The observation supporting apparatus 2 of the present embodiment determines whether (the orbit of) the moving object is known or unknown based on the trajectory (the bright line 21) of the moving object in the viewing field which has been detected in the once observation. In other words, the observation supporting apparatus 2 of the present embodiment carries out the "known or unknown" determination of the moving object based on one orbit, at a predetermined observation time, of the known orbits. That is, because the "known or unknown" determination of the moving object can be made by using the observation result in a predetermined observation period without estimating the whole orbit, the observation supporting apparatus 2 can efficiently discover an unknown object.

According to the observation supporting apparatus 2 of the third embodiment, it is possible to acquire the data which are necessary to estimate the whole orbit (in this example, the data showing whether the detected moving object is known or unknown) even by the observation equipment (e.g. the optical telescope 1) having a viewing field 10 smaller than a predetermined size. Also, in the present embodiment, because whether the moving object is known or unknown is determined based on the estimate orbit 100 in the viewing field 10 without calculating the orbit 6 matters of the moving object, the observation cost for the "known or unknown" determination can be reduced.

Fourth Embodiment

Figure 14:
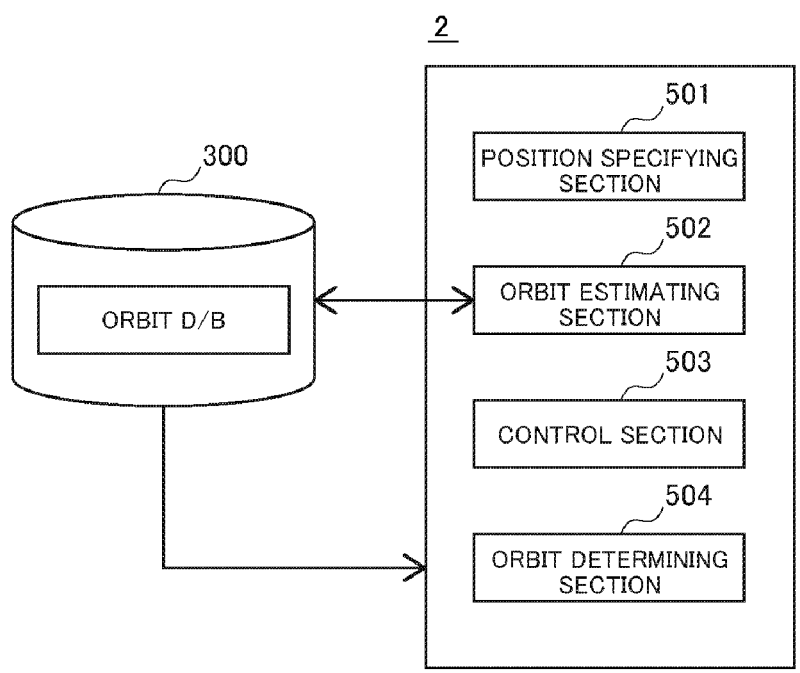
FIG. 14 is a diagram showing a configuration example of the observation supporting apparatus in a fourth embodiment.
Figure 15:
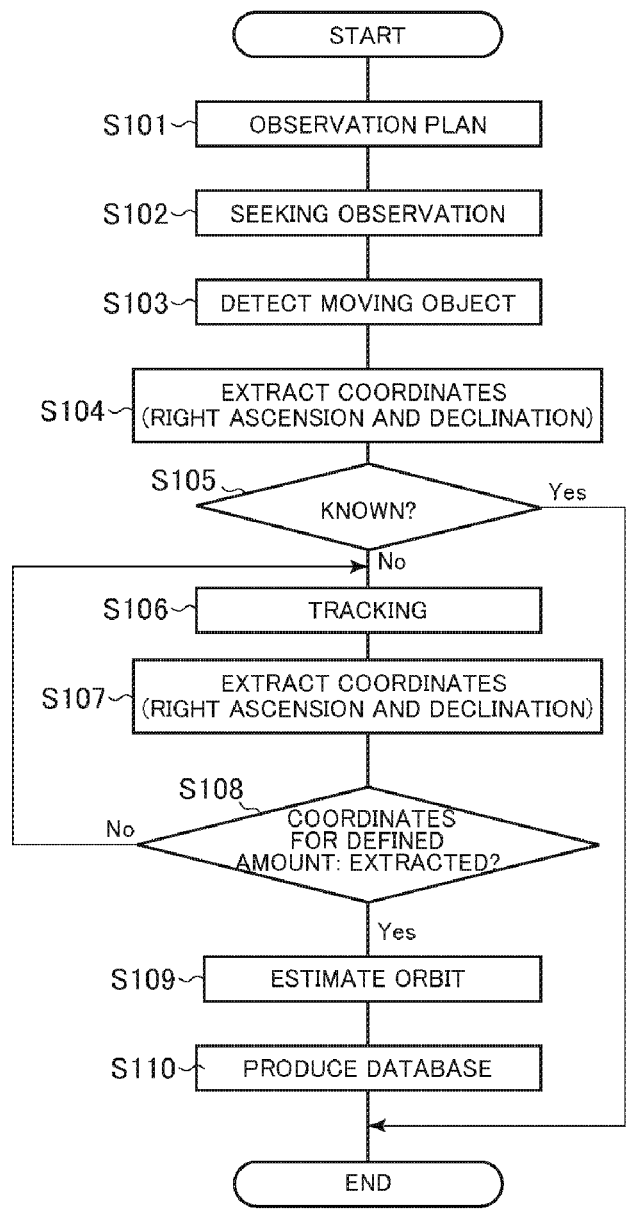
FIG. 15 is a diagram showing an example of the observation method in the fourth embodiment.

Referring to FIG. 14 to FIG. 15, the observation system and the observation supporting apparatus 2 according to a fourth embodiment of the present invention will be described. The observation system and the observation supporting apparatus 2 of the fourth embodiment can carry out a combination of the operations in the first to third embodiments. That is, the observation system and the observation supporting apparatus 2 of the fourth embodiment carries out the "known or unknown" determination of the moving object in the same method as the third embodiment. When determining to be the unknown object, the observation system and the observation supporting apparatus 2 carry out the estimation of the whole orbit (the orbit around the earth) of the moving object, in the same method as the second embodiment. FIG. 14 is a functional block diagram showing a configuration example of the observation supporting apparatus 2 of the fourth embodiment. Referring to FIG. 14, the CPU 201 according to the fourth embodiment executes the observation support program 50 to realize each of the functions of the position specifying section 501, the orbit estimating section 502, the control section 503 and the orbit determining section 504

The orbit estimating section 502 of the fourth embodiment determines whether or not an orbit is to be estimated based on the "known or unknown" determination result. Specifically, the orbit estimating section 502 does not estimate an orbit when the detected moving object is known, and specifies the known orbit 200 determined to coincide with the estimate orbit 100 under the determination condition as the orbit of the moving object. On the other hand, when the detected moving object is unknown, the orbit estimating section 502 calculates the pointing direction 11, controls the observation direction of the optical telescope 1 by the control section 503, and carries out the tracking observation, like the second embodiment. Then, the orbit estimating section 502 calculates the whole orbit (e.g. the orbit around the earth) which can be specified based on the orbit 6 matters by using the observation result of the optical telescope 1. Because an operation except these functions is the same as in the first to third embodiments, a detailed description is omitted.

FIG. 15 is a flow diagram showing an operation example of the observation system of the fourth embodiment. Referring to FIG. 15, the observation supporting apparatus 2 makes an observation plan in response to an operation by the user (Step S101). For example, the setting of a pointing direction and the time in the observation of the optical telescope 1-1 which observes the moving object, and the setting of an observation possible area of the optical telescope 1-2 tracking the moving object after the detection of the moving object are prescribed as the observation plan.

Figure 5:
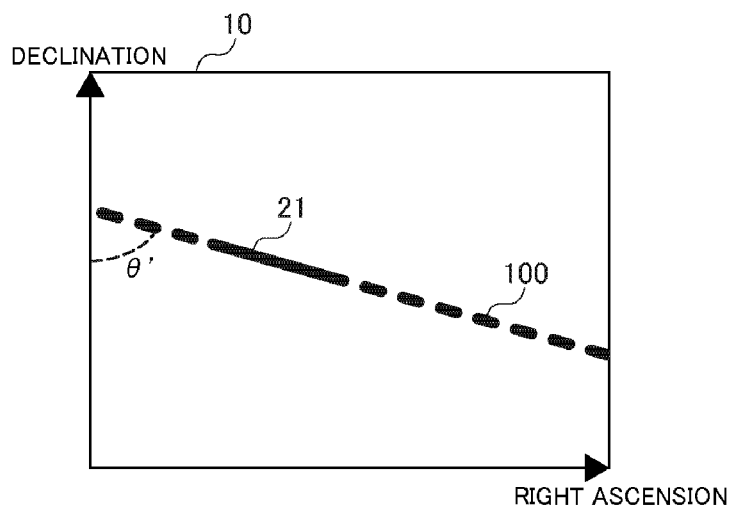
FIG. 5 is a diagram showing an example of a moving object observed by the observation system of the present invention and an estimate orbit.

The observation supporting apparatus 2 controls the optical telescope 1-1 in which the observation direction is fixedly set as shown in FIG. 5, based on the observation plan, so as to execute the search observation (Step S102). The optical telescope 1-1 images the observation direction which is instructed from the observation supporting apparatus 2 at a predetermined time or for a predetermined period. It is desirable that an imaging parameter (for example, are exposure time, a focal distance, a viewing angle, a magnification, a diaphragm) is previously set based on the observation plan. Also, it is desirable that a plurality of optical telescopes 1-1 are used for the observation and that a wide region is imaged spatially and continuously in cooperation to the plurality of optical telescopes 1-1.

When the moving object is detected, the observation supporting apparatus 2 extracts the coordinate point of the moving object (Steps S103, S104). At this time, the observation supporting apparatus 2 extracts the coordinate point which show the position of the moving object and the coordinate point used for the calculation of the estimate orbit 100. However, both may be the same coordinate point. It is desirable that the extracted coordinate point contains a right-ascension and a declination of the equatorial coordinate system. For example, the observation supporting apparatus 2 extracts the coordinate points of two ends on the bright line 21 (trajectory) showing the detected moving object as the coordinate points for calculating the estimate orbit 100, and extracts the coordinate points on the bright line 21 at a predetermined time as the coordinate points showing the position of the moving object. For example, the observation supporting apparatus 2 extracts one of the two ends on the bright line 21 (for example, the older observation time) or the center point of the bright line 21 as a coordinate point showing the position of the moving object.

The observation supporting apparatus 2 determines whether (the orbit of) the detected moving object is known or unknown (Step S105). In this case, the estimate orbit is calculated in the same way as the third embodiment, and the "known or unknown" determination of the moving object is carried out through comparison with each of the known orbits in the orbit database 300. In this case, when determining that the moving object is known, the observation supporting apparatus 2 visibly outputs the orbit coinciding under the determination condition from the output unit 204 as the whole orbit of the moving object. Thus, the orbit detection processing is ended (Step S105; Yes). On the other hand, when determining that the moving object is unknown, the observation supporting apparatus 2 determines the pointing direction 11 by using the estimate orbit 100 based on the bright line 21, and controls the tracking optical telescope 1-2 and starts the tracking of the moving object (Step S106).

At the step S106, the observation supporting apparatus 2 sets a next pointing direction 11 of the optical telescope 1 on a tracking (predicted) line 400 obtained by extending the estimate orbit 100, like the second embodiment. The tracking optical telescope 1-2 awaits the moving object in the set pointing direction 11 and observes the moving object at a predetermined time. When detecting the moving object at the step S106, the observation supporting apparatus 2 extracts the coordinate point showing the position of the moving object and the coordinate point used for the calculation of the estimate orbit 100, like the step S104 (Step S107). The operation of steps S106 and S107 is repeatedly carried out until coordinate points of the number (e.g. a defined quantity) which is necessary to estimate an orbit are acquired (Step S108; No). Note that the bright line 21 of the moving object is detected through the tracking operation at the step S106, and the "known or unknown" determination may be carried out, like the step S105. That is, the "known or unknown" determination may be carried out plural times according to the observation result after the tracking operation.

When three or more coordinate points of the moving object are acquired, the observation supporting apparatus 2 estimates the whole orbit by using the coordinate points, in the same way as the second embodiment (Step S109). The specified whole orbit is stored in the orbit database 300 (Step S110).

As mentioned above, the observation supporting apparatus 2 of the present embodiment carries out the "known or unknown" determination based on the trajectory (the bright line 21) of the moving object in the viewing field detected through once observation and determines whether or not the tracking observation for calculation of the orbit should be carried out according to the determination result. The observation supporting apparatus 2 of the present embodiment can carry out the "known or unknown" determination of the moving object by using the observation result in a predetermined observation period without estimating the whole orbit, like the third embodiment. Therefore, the unknown object can be efficiently discovered.

Also, according to the observation supporting apparatus 2 of the fourth embodiment, the data necessary to estimate the whole orbit (the pointing direction 11 necessary to track, the coordinate points of the moving object, and the data showing whether or not the detected moving object is known) can be acquired even by the observation equipment having the viewing field 10 smaller than a predetermined size (e.g. the optical telescope 1), like the first embodiment. Also, the tracking observation and the estimation of the whole orbit 30 of the moving object whose whole orbit is not known become possible only by the optical telescope 1.

Also, in the present embodiment, because the position of the moving object out of the viewing field 10 can be estimated by using the trajectory (the bright line 21) of the moving object which is observed in the viewing field 10 of the optical telescope 1, it is possible to acquire the coordinate point of the moving object in the observation elongation which is larger than the viewing angle of the optical telescope 1. Moreover, in the present embodiment, because the moving object is tracked based on the estimate orbit 100 in the viewing field 10 without calculating the orbit 6 matters of the moving object, the observation cost necessary for the tracking operation can be reduced and an error risk when calculating the orbit 6 matters can be excluded.

Moreover, the observation supporting apparatus 2 in the present embodiment detects the coordinates (the right-ascension, the declination) of the moving object at the observation elongation which is larger than the viewing angle, and the coordinate points are used for the orbit estimation.

Therefore, the whole orbit 30 (e.g. the orbit around the earth) specified by the orbit 6 matters can be precisely estimated.

In the above, the embodiments of the present invention have been described in detail. However, the specific configuration is not limited to the above embodiments and a modification in the range which does not deviate from the scope of the present invention is contained in the present invention. Also, the first to fourth embodiments can be combined in the range which the technical contradiction does not occur. Note that the whole orbit which is estimated in the present invention is not limited to the orbit around a star, and may be a parabola orbit of the moving object.

This application claims a priority on convention based on Japanese Patent Application JP 2014-098109 filed on May 9, 2014. The disclosure thereof is incorporated herein by reference.

What is claimed is:

1. An observation supporting apparatus comprising:
a plurality of first earth-based telescopes configured to detect a moving object, the plurality of first earth-based telescopes having fixed observation directions, and the moving object orbiting the earth;
a second earth-based telescope configured to detect the moving object; and
a computer configured to control an observation direction of the second earth-based telescope, the computer comprising:
a storage unit configured to store a program; and
a processing unit configured to executing the program to realize:
a position specifying section configured to specify a coordinate point of the moving object detected in a viewing field through observation with one of the plurality of first earth-based telescopes;
an orbit estimating section configured to calculate an estimate visual trace of the moving object in the viewing field based on three or more coordinate points and to determine a new viewing field by using the estimate visual trace; and
a control section configured to control the second earth-based telescope to turn the observation direction to the new viewing field,
wherein the orbit estimating section is configured to acquire data used to estimate a position of the moving object in the new viewing field and to calculate a whole orbit of the moving object by using coordinate points of the moving object detected in an observation range containing the viewing field and the new viewing field.

2. The observation supporting apparatus according to claim 1, wherein the orbit estimating section is configured to determine whether the whole orbit of the moving object is known or unknown, based on a result of a comparison between a known orbit visual trace in a predetermined period, which contains a time of detection of the moving object, and the estimate visual trace.

3. The observation supporting apparatus according to claim 2, wherein the orbit estimating section determines that the whole orbit of the moving object is known, when the estimate visual trace is a primary curve subjected to approximate linearization, and an inclination of the estimate visual trace and an inclination of the known orbit visual trace coincide with each other within a predetermined error.

4. The observation supporting apparatus according to claim 1, wherein the orbit estimating section determines the new viewing field on an extension of the estimate visual trace.

5. The observation supporting apparatus according to claim 1, wherein the plurality of first earth-based telescopes and the second earth-based telescope are optical telescopes.

6. The observation supporting apparatus according to claim 1, wherein the coordinate points are on an equatorial coordinate system.

7. The observation supporting apparatus according to claim 1, wherein the plurality of first earth-based telescopes are configured to be arranged such that viewing field of the plurality of first earth-based telescopes are aligned in a line.

8. The observation supporting apparatus according to claim 1, wherein an elevation angle of each of the plurality of first earth-based telescopes is lower than an elevation angle of the second earth-based telescope.

9. An observation supporting method which is executed by a computer, the observation supporting method comprising:
specifying a coordinate point of a moving object detected in a viewing field through observation with one of a plurality of first earth-based telescopes, the moving object orbiting the earth;
calculating an estimate visual trace of a moving object in a viewing field based on three or more coordinate points of the moving object detected in the viewing field; and
determining a new viewing field by using the estimate visual trace;
controlling a second earth-based telescope to turn an observation direction of the second earth-based telescope to the new viewing field;
acquiring data used to estimate a position of the moving object in the new viewing field; and
calculating a whole orbit of the moving object by using coordinate points of the moving object detected in an observation range containing the viewing field and the new viewing field,
wherein observation directions of the plurality of first earth-based telescopes are fixed.

10. The observation supporting method according to claim 9, wherein the acquiring of the data comprises
determining whether the whole orbit of the moving object is known or unknown based on a result of a comparison between a known orbit visual trace and the estimate visual trace in a predetermined period which contains a time at which the moving object is detected.

11. The observation supporting method according to claim 10, wherein a determination is made that the whole orbit of the moving object is known, when the estimate visual trace is a primary curve subjected to approximate linearization, and an inclination of the estimate visual trace and an inclination of the known orbit visual trace coincide with each other within a predetermined error.

12. The observation supporting method according to claim 10, wherein the new viewing field is determined on an extension of the estimate visual trace.

13. The observation supporting method according to claim 9, wherein the plurality of first earth-based telescopes and the second earth-based telescope are optical telescopes.

14. The observation supporting method according to claim 9, wherein the coordinate points are on an equatorial coordinate system.

15. A non-transitory computer-readable recording medium which stores a computer-executable observation support program to make a computer execute an observation supporting method comprising:

specifying a coordinate point of a moving object detected in a viewing field through observation with one of a plurality of first earth-based telescopes, the moving object orbiting the earth;

calculating an estimate visual trace of the moving object in the viewing field based on three or more coordinate points of the moving object detected in the viewing field;

determining a new viewing field by using the estimate visual trace;

controlling a second earth-based telescope to turn an observation direction of the second earth-based telescope to the new viewing field;

acquiring data used to estimate a position of the moving object in the new viewing field; and calculating a whole orbit of the moving object by using coordinate points of the moving object detected in an observation range containing the viewing field and the new viewing field, wherein observation directions of the plurality of first earth-based telescopes are fixed.

* * * * *